(12) United States Patent
Choe

(10) Patent No.: US 8,661,886 B2
(45) Date of Patent: Mar. 4, 2014

(54) VALVE STEM GROMMET STRUCTURE

(75) Inventor: Seunghun Choe, Novi, MI (US)

(73) Assignee: Nissan North America, Inc., Franklin, TN (US)

( * ) Notice: Subject to any disclaimer, the term of this patent is extended or adjusted under 35 U.S.C. 154(b) by 211 days.

(21) Appl. No.: 13/415,956

(22) Filed: Mar. 9, 2012

(65) Prior Publication Data
US 2013/0233399 A1 Sep. 12, 2013

(51) Int. Cl.
*B60C 23/02* (2006.01)

(52) U.S. Cl.
USPC .......................................................... 73/146.8

(58) Field of Classification Search
USPC ................................................. 73/146–146.8
See application file for complete search history.

(56) References Cited

U.S. PATENT DOCUMENTS

| | | | |
|---|---|---|---|
| 6,904,795 B1 * | 6/2005 | Uleski | 73/146 |
| 7,444,860 B1 * | 11/2008 | Poparad | 73/146.8 |
| 7,694,557 B2 | 4/2010 | Hettle et al. | |
| 2013/0233068 A1 * | 9/2013 | Choe et al. | 73/146.3 |
| 2013/0233069 A1 * | 9/2013 | Amamiya et al. | 73/146.8 |

* cited by examiner

*Primary Examiner* — Andre Allen
(74) *Attorney, Agent, or Firm* — Young, Basile, Hanlon & MacFarlane, P.C.

(57) ABSTRACT

The disclosed embodiments include a valve stem assembly for a tire pressure monitoring system sensor. The assembly can comprise a valve stem body, and a grommet for purposes of engaging a vehicle wheel. The valve stem body can comprise an attachment end to be attached to a pressure sensor to determine tire air pressure, and an air transfer end to receive a gas to fill the tire. The grommet can further comprise flanges with dimensions such that the grommet can limit movement of the valve stem assembly relative to the vehicle wheel. Methods for installing the valve stem assembly are also disclosed.

17 Claims, 3 Drawing Sheets

VALVE STEM GROMMET STRUCTURE

BACKGROUND

Vehicles are used for transporting people and cargo over land, water and through the air. Vehicles designed for land travel employ various mechanisms to apply steering and driving forces to the ground. Land vehicles may broadly be classified as wheeled, tracked, railed or skied, depending on the mechanism used to apply the steering and driving forces. A wheeled vehicle, for example, may employ wheel assemblies rotatably mounted on an axle attached to the vehicle. The wheel assembly enables the vehicle to move through rotation of the wheel assembly about the axle. A driving force may be applied to one or more of the wheel assemblies to propel the vehicle. The driving force may be generated by a power source, such as an internal combustion engine or electric motor.

Wheel assemblies for use on land vehicles are designed to handle the steering and driving forces normally encountered when operating the vehicle, and to absorb impact forces that may occur as the wheel assembly travels over imperfections in the road surface. The wheel assemblies may include a pneumatic tire mounted on a rim of a wheel. The wheel may be attached to a hub on a vehicle axle.

The tire may be pressurized with air or another gas, such as nitrogen, to provide buoyancy for supporting the vehicle load and cushioning for absorbing shocks caused by imperfections in the road. Air for inflating the tire may be introduced through a valve stem attached to an opening in the wheel adjacent the wheel rim. The valve stem may include a valve that may be opened to admit pressurized gas (i.e., air) to an interior region of the tire, and which automatically closes and is kept sealed by the interior tire pressure, a spring, or both, to prevent the gas from escaping. The valve stem may include a flexible grommet that seals the valve stem against the wheel to prevent pressurized gas from escaping from the tire. The valve stem is typically assembled to the wheel by inserting the valve stem through the valve stem opening in the wheel from inside the wheel.

The tire may be inflated to a recommended pressure selected to provide a desired balance between vehicle performance and handling, ride quality, and tire life. For example, an underinflated tire may provide a vehicle operator with a softer ride by decreasing tire stiffness, but may also negatively impact vehicle handling and fuel mileage. Under-inflation may also result in premature tire wear and diminished tire performance in certain operating conditions. Overinflating a tire, on the other hand, may increase tire stiffness and result in a firmer ride. Over-inflation may also have a detrimental effect on tire life and result in decreased tire performance under certain operating conditions.

To monitor and help maintain a tire at a recommended inflation pressure and to alert a vehicle operator of an extreme under-inflation condition, a tire pressure monitoring system (TPMS) may be employed to automatically monitor the inflation pressure. A TPMS electronically monitors a tire inflation pressure. A TPMS may also be referred to as a tire-pressure indication system (TPIS). A TPMS reports real-time tire pressure information to a vehicle operator, typically via a gauge, a pictogram display, or a simple low-pressure warning light. A TPMS may employ a pressure sensor mounted internally within the tire for measuring the tire inflation pressure. The collected pressure data may be transmitted to the vehicle's instrument cluster or a corresponding monitor for viewing by the vehicle operator. Data may be transmitted from the pressure sensor to the monitor or display via a battery powered radio-frequency (RF) communication device. The pressure sensor is generally coupled to the in-tire portion of the valve stem when the tire is mounted to the rim of the wheel.

SUMMARY

The disclosed embodiments include a valve stem for a tire pressure monitoring system sensor. In one embodiment, the valve stem comprises a valve stem body including an attachment end connectable to the tire pressure monitoring system sensor and an opposite air transfer end. Also included is a grommet attached to the valve stem body, the grommet including a first flange and a second flange, each flange extending radially outward from the valve stem body, the first flange including a tapered peripheral edge having a first region arranged a first radial distance from a longitudinal axis of the valve stem body and second region arranged a second radial distance from the longitudinal axis of the valve stem body, wherein the second radial distance is greater than the first radial distance and the first region is arranged axially between the second region and the attachment end of the valve stem body.

In another embodiment, a tire pressure monitoring system assembly comprises a rim for supporting a tire, the rim including an inner surface and an opposite outer surface, the rim defining a valve stem opening extending from the inner surface to the outer surface. Also included in the system is a tire pressure monitoring system sensor arranged proximate the inner surface of the rim. The tire pressure monitoring sensor system also includes a valve stem body including an attachment end connectable to the tire pressure monitoring system sensor and an opposite air transfer end. Further included in the system assembly is a grommet arranged between the attachment end and the air transfer end of the valve stem body, the grommet including a first flange engaging the inner surface of the rim and a second flange engaging the outer surface of the rim, the first flange including a tapered peripheral edge having a first region displaced a first radial distance from a longitudinal axis of the valve stem body and second region displaced a second radial distance from the longitudinal axis of the valve stem body, wherein the second radial distance is greater than the first radial distance and the first region is arranged between the second region and the attachment end of the valve stem body.

Also disclosed are methods of installing a valve stem in a rim of a tire. One embodiment of a method of installing a valve stem assembly into a valve stem opening of a rim for supporting a tire, the rim having an outer surface and an inner surface, comprises inserting an attachment end of a valve stem body through the valve stem opening of the outer surface of the rim. The valve stem body has a grommet positioned between the sensor attachment end and an opposite air transfer end of the valve stem body, the grommet including a first flange and second flange each extending radially outward from the valve stem body, the first flange disposed between the second flange and the attachment end of the valve stem body, the first flange including a tapered peripheral edge having a first region arranged a first radial distance from a longitudinal axis of the valve stem body and second region arranged a second radial distance from the longitudinal axis of the valve stem body, wherein the second radial distance is greater than the first radial distance and the first region is arranged axially between the second region and the attachment end of the valve stem body. The attachment end is passed through the valve stem opening past the inner surface of the rim. The first flange of the grommet is passed through the valve stem opening past the inner surface of the rim until the rim is seated between the first flange and the second flange with the first flange engaging the inner surface of the rim and the second flange engaging the outer surface of the rim. A tire pressure sensor is then attached to the attachment end of the valve stem body.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
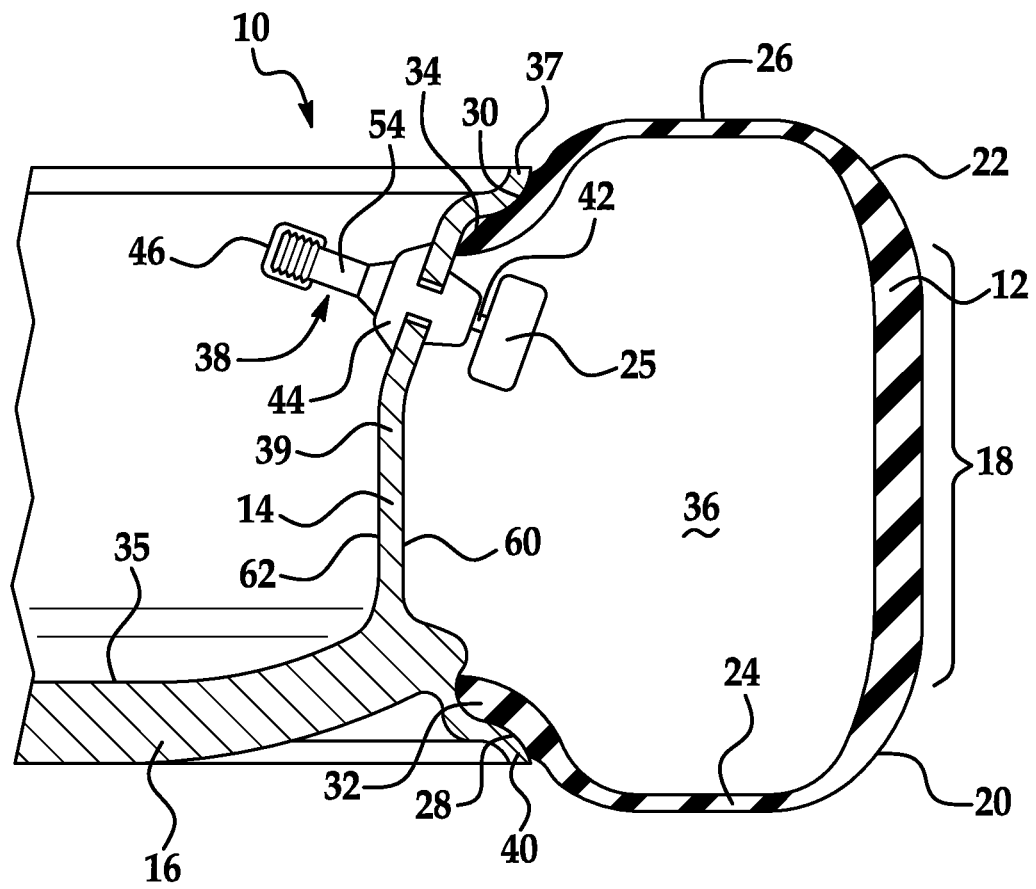
FIG. 1 is a partial cross-sectional view of a vehicle wheel assembly employing an exemplary valve stem having a grommet according to embodiments herein.

Referring now to the discussion that follows and also to the drawings, illustrative approaches to the disclosed systems and methods are shown in detail. Although the drawings represent some possible approaches, the drawings are not necessarily to scale and certain features may be exaggerated, removed, or partially sectioned to better illustrate and explain the present invention. Further, the descriptions set forth herein are not intended to be exhaustive or otherwise limit or restrict the claims to the precise forms and configurations shown in the drawings and disclosed in the following detailed description.

With reference to FIG. 1, an exemplary wheel assembly 10 may include a pneumatic tire 12 mounted on a rim 14 of a wheel 16. The terms "wheel" and "rim" may have inconsistent and overlapping meanings within the industry. For example, it is not uncommon for the terms "wheel" and "rim" to be used synonymously to refer to the entire component to which the tire attaches. Decorative wheels, in particular, are often referred to as "rims". The term "rim" has also been used more narrowly to refer specifically to the outer circumferential portion of the wheel that adjoins the tire. To avoid confusion, the term "wheel" shall be used throughout this application to refer to the entire component to which the tire attaches, and generally includes an inner hub to which an outer rim is attached. The term "rim" refers specifically to the outer circumferential region of the "wheel" that adjoins the tire. The term "wheel assembly" refers to the combination wheel and tire assembly.

With continued reference to FIG. 1, tire 12 includes a tread region 18 that contacts the road surface. Tread region 18 includes various geometrically shaped grooves, lugs and voids that cooperate to channel away water and provide traction under various operating conditions. An inner shoulder 20 and outer shoulder 22 generally delineate lateral edges of tread region 18. Extending radially inward from shoulders 20 and 22 is an inner sidewall 24 and an opposite outer sidewall 26, respectively. Inner sidewall 24 includes an inner bead 28 formed proximate an inner circumferential edge 32 of inner sidewall 24. Outer sidewall 26 includes an outer bead 30 formed proximate an inner circumferential edge 34 of outer sidewall 26. Beads 28 and 30 cooperatively engage rim 14 of wheel 16 to form a generally airtight seal between tire 12 and wheel 16. Tire 12 may be constructed from a flexible elastomer material, such as rubber, with reinforcing materials such as fabric and wire.

Wheel 16 generally includes a hub 35 that connects to and extends radially inward from rim 14. Hub 35 includes features for connecting wheel 16 to a vehicle axle. Attached to an outer perimeter of hub 35 is the generally cylindrically shaped rim 14 to which tire 12 attaches. An outer end 37 of rim 14 engages outer bead 30 of tire 12 and an inner end 40 of rim 14 engages inner bead 28 when tire 12 is mounted to rim 14. Rim 14 includes a wall 39 that extends between ends 37 and 40, and includes an inner surface 60 and an outer surface 62. Tire 12 and inner surface 60 of rim 14 together define and interior region 36 for receiving a pressurized gas, such as air or nitrogen, for inflating tire 12 to a desired inflation pressure.

Wheel 16 may be constructed from multiple stamped, cast and forged parts assembled together to form wheel 16, or may be formed as one continuous part. Wheel 16 may be made from a wide variety of materials, including but not limited to, steel, aluminum and magnesium alloys, and composites.

Tire 12 may be inflated to a desired inflation pressure by introducing a pressurized gas to interior region 36 of tire 12 through a valve stem 38. Valve stem 38 includes a valve 51 (see FIG. 3) that opens to admit the pressurized gas (i.e., air) into interior region 36 of tire 12 to inflate the tire. The valve 51 is generally configured to automatically close and maintain a generally airtight seal in response to pressure within tire 12, a spring, or both, to prevent the gas from escaping. A Schrader valve is an example of one such valve. Schrader valves (also known as American valves) include a valve body into which a poppet valve is threaded with a spring attached. Schrader valves are commonly used in connection with automobile tires.

The inflation pressure of tire 12 may be monitored through use of a tire pressure monitoring system (TPMS), which may be configured to detect a pressure within interior region 36 of tire 12. A TPMS may alternately be referred to as a tire pressure indication system (TPIS). For purposes of discussion, it shall be understood that reference throughout the application to a TPMS system shall also cover a tire pressure indication system (TPIS), as well as other pressure monitoring systems.

Continuing to refer to FIG. 1, a TPMS typically includes a pressure sensor 25 that operates to collect pressure data and transmit the data real-time to an associated receiver. The receiver may display the data to a vehicle operator via a pictogram display, or a simple low-pressure warning light. Pressure sensor 25 may be installed within interior region 36 of tire 12. Pressure sensor 25 may be attached to wheel 16 or to an attachment end 50 of valve stem 38, for example, as illustrated in FIG. 1.

Figure 2:
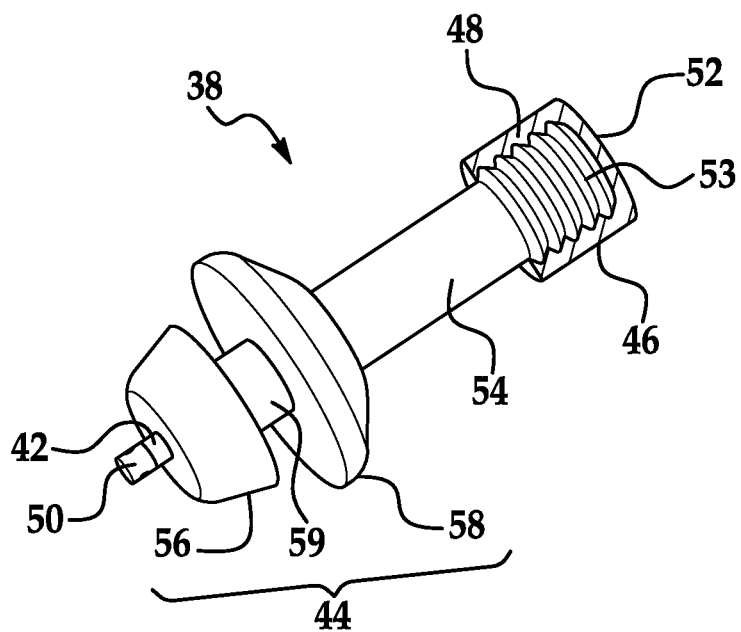
FIG. 2 is a perspective view of the valve stem shown removed from the wheel assembly.

One embodiment of the valve stem assembly 38 is depicted in FIG. 2. The valve stem assembly 38 can consist of a valve stem body 54, and grommet 44. The valve stem body 54 can have an attachment end 50 to engage the pressure sensor 25, and an opposite air transfer end 52. A cap 46 (shown in cross-section in FIG. 2) can be releasably engaged to the valve stem body 54 at the air transfer end 52. The cap 46 can be engaged to the valve stem body 54 via a threaded region 53 on the air transfer end 52 of the valve stem body 54 and a correspondingly threaded section 48 on the cap 46.

Figure 3:
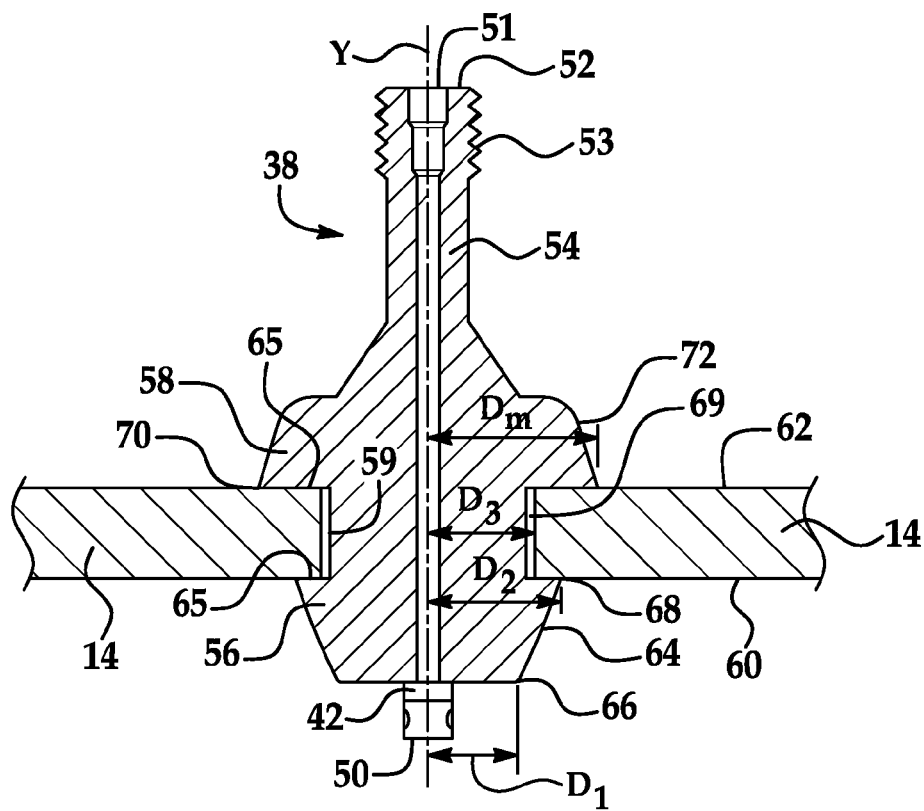
FIG. 3 is a cross-sectional view of the valve stem shown attached to a rim of the wheel assembly.

The valve stem assembly 38 can have a grommet 44 consisting of a first flange 56, a second flange 58, and a neck 59 connecting the first and second flanges 56, 58. The first flange 56 is disposed between the second flange 58 and the attachment end 50 of the valve stem body 54. Referring to FIG. 3, the grommet 44 can secure the valve stem assembly 38 to the rim 14. The neck 59 is sized to span a thickness of the rim 14, such that an inner surface 60 of the rim engages the first flange 56 and an outer surface 62 of the rim 14 engages the second flange 58. The first and second flanges 56, 58 can each have a substantially flat surface 65 that engages the inner and outer surfaces 60, 62 of the rim 14, respectively. The pressure sensor 25 is attached to the attachment end 50 of the valve stem body 54 after the grommet 44 is in place with respect to the rim 14.

Figure 4:
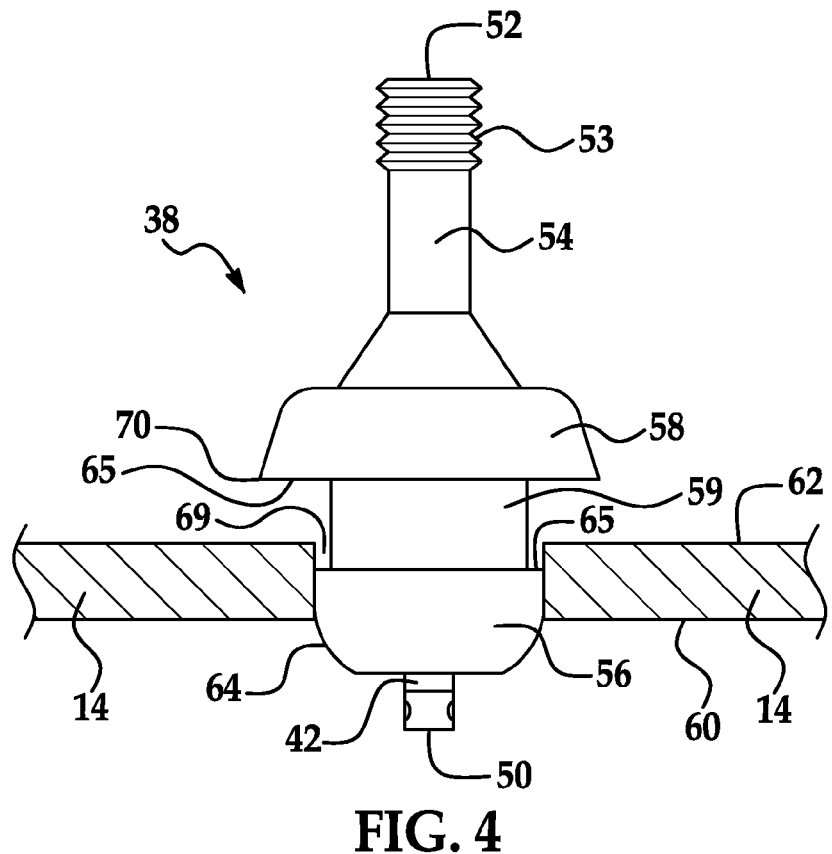
FIG. 4 is a side view of a representative valve stem, the valve stem shown being attached to a rim shown in cross-sectional view.

As shown in FIGS. 3 and 4, the first and second flanges 56, 58 extend radially outward from the valve stem body 54. The second flange 58 extends a greater radial distance than the first flange 56 from the longitudinal axis Y of the valve stem assembly 38. The first flange 56 of grommet 44 can have a first region 66 and a second region 68, with an outer peripheral edge 64 extending between the first region 66 and second region 68. The outer peripheral edge 64 is tapered radially outward in a direction extending from the air transfer end 52 of the valve stem body 54 toward the attachment end 50 of the valve stem body 54. The first region 66 is located between the second region 68 and the attachment end 50 of the valve stem body 54. The first region 66 is arranged at a distance D1 measured radially from the longitudinal axis Y of valve stem body 54, and the second region 68 is arranged at a distance D2 measured radially from the longitudinal axis Y of valve stem body 54.

The distance D2 is greater than D1, such that the second region 68 of the outer peripheral edge 64 is located farther from the longitudinal axis Y than the first region 66. The distance D1 of the first region 66 can be less than a distance D3 (radius) of the valve stem opening 69 in rim 14. The distance D2 of the second region 68 can be greater than the distance D3 of the valve stem opening 69 of the rim 14. The first flange 56 of grommet 44 can be substantially conical in shape, such that the radial dimensions of the outer peripheral edge 64 decrease linearly from the second region 68 to the first region 66. However, the conical shape is provided as an example and is not meant to be limiting.

The second flange 58 extends a maximum radial distance Dm from the longitudinal axis Y of the valve stem body 54 that is greater than the second radial distance D2 at which the second region 68 is arranged. The maximum radial distance Dm of the second flange 58 can be at a region 70 adjacent to the outer surface 62 of the rim 14 when installed. As illustrated in the figures, the second flange 58 can also have a an outer peripheral edge 72 that is tapered in a direction extending from the neck 59 of the grommet 44 toward the air transfer end 52 of the valve stem body 54. The second flange 58 can also be substantially conical in shape. However, this is provided as an illustration and is not meant to be limiting. The second flange 58 can alternatively have a non-tapered outer peripheral edge or can be a donut shape, as additional examples.

Figure 5:
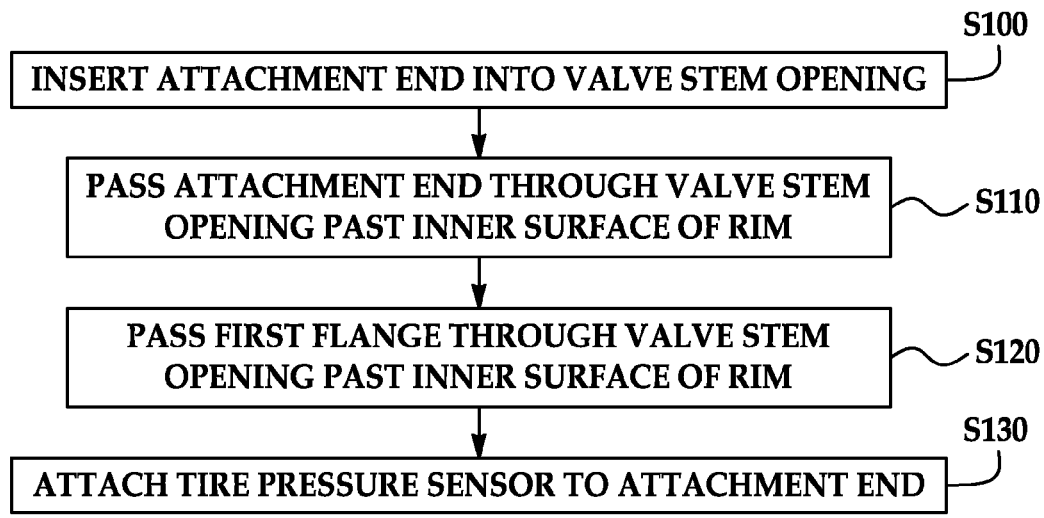
FIG. 5 is a flow diagram of a method of installation as disclosed herein.

The valve stem assemblies 38 disclosed herein are installed in the rim 14 of the wheel 16 in a direction from the outside surface 62 of the rim 14 toward inner surface 60 of the rim, as illustrated in FIG. 4. The method, diagrammed in FIG. 5, includes inserting the attachment end 50 of the valve stem body 54 through the valve stem opening 69 of the outer surface 62 of the rim 14. (S100) The attachment end 50 is passed through the valve stem opening 69 past the inner surface 60 of the rim 14. (S110) The first flange 56 of the grommet 44 is passed through the valve stem opening 69 past the inner surface 60 of the rim 14 until the rim 14 is seated between the first flange 56 and the second flange 58 with the first flange 56 engaging the inner surface 60 of the rim 14 and the second flange 58 engaging the outer surface 62 of the rim 14 (S120). The tire pressure sensor 25 is then attached to the attachment end 50 of the valve stem body 54. (S130)

When inserting the valve stem assembly 38 into the valve stem opening 69 of rim 14, the first flange 56 of the grommet 44 deforms as shown in FIG. 4 to fit into the valve stem opening 69. To permit this deformation, the first flange 56 of the grommet 44 can be made from an elastic material that allows for the elastic compression of the first flange 56. The first region 66 of the first flange 56 having a radial dimension D1 less than the radial dimension D3 of the valve stem opening 69 enables the first region 66 to easily insert into the valve stem opening 69. The tapered peripheral edge 64 of the first flange 56 assists in passing the first flange 56 through the valve stem opening 69 past the inner surface 60 of the rim 14. The second region 68 compresses from dimension D2 to dimension D3 or slightly less than dimension D3 to fit through the valve stem opening 69. When the first flange 56 has passed through the valve stem opening 69, the first flange 56 regains its original shape as the elasticity of the first flange 56 reverses the compression required to fit the first flange 56 through the valve stem opening 69, with the second region expanding back to dimension D2.

With the pressure sensor 25 is attached to the in-tire portion 42 of valve stem assembly 38 during vehicle operation, the valve stem assembly 38 may be subject to several forces due in part to the weight distribution of the valve stem assembly 38 and the pressure sensor 25, with the center of gravity located within the interior region 36, centripetal forces F from the wheel assembly 10 spinning, and road forces from driving on an uneven surface. These forces on the valve stem assembly 38 pull the valve stem assembly 38 toward the interior region 36. This condition can be most prevalent during high speed operation of the wheel assembly in low temperature conditions. The valve stem assembly 38 and pressure sensor 25 may be displaced longitudinally inward/outward of the rim 14, or may rotate relative to the rim 14, when traditional grommet dimensions are utilized. When valve stem assembly 38 moves relative to the rim 14, the grommet 44 may deform or displace, allowing air to slowly escape from the interior region 36 of the tire 12. The relative movement of valve stem assembly 38 and pressure sensor 25 may also result in improper pressure readings by sensor 25 or durability problems to the related components.

Figure 6:
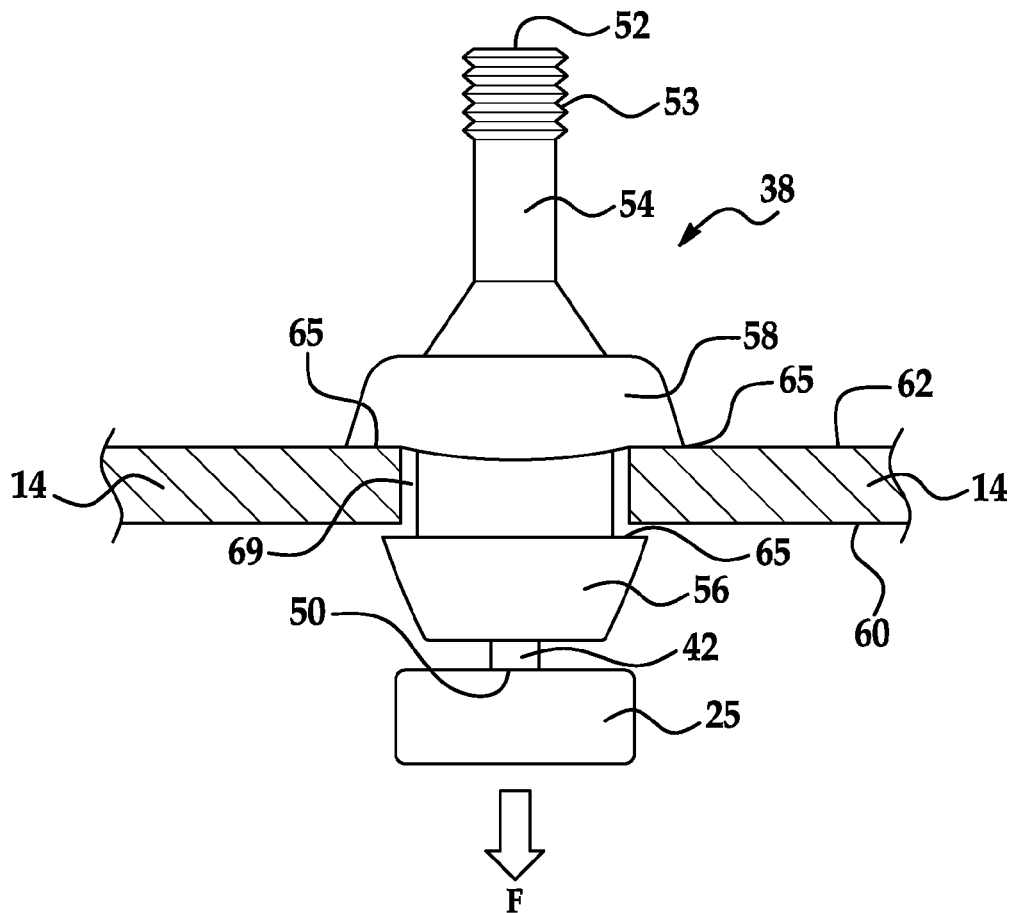
FIG. 6 is a side view of a representative valve stem, the valve stem shown attached to a tire rim in cross sectional view during operation of the wheel assembly.

Referring to FIG. 6, the grommet 44 configurations disclosed herein create a tighter seal between the second flange 58 of the grommet 44 and the outer surface 62 of the rim 14 under rotational or translational forces. This tighter seal can restrict the inward movement of valve stem body 54, the grommet 44, and the tire pressure monitoring system sensor 25, which can reduce or eliminate air leakage, variations in pressure readings, and durability issues with valve assembly components.

It is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

What is claimed is:

1. A valve stem for a tire pressure monitoring system sensor, the valve stem comprising:
   a valve stem body including an attachment end connectable to the tire pressure monitoring system sensor and an opposite air transfer end; and
   a grommet attached to the valve stem body, the grommet including a first flange and second flange, each flange extending radially outward from the valve stem body, the first flange disposed between the second flange and the attachment end of the valve stem body, the first flange including an outer peripheral edge tapering radially outward from a first region arranged a first radial distance from a longitudinal axis of the valve stem body to a second region arranged a second radial distance from the longitudinal axis of the valve stem body, wherein the second radial distance is greater than the first radial distance and the first region is arranged axially between the second region and the attachment end of the valve stem body.

2. The valve stem of claim 1, wherein the first flange includes a substantially conical shape.

3. The valve stem of claim 1, wherein the second flange extends a maximum radial distance from the longitudinal axis of the valve stem body that is greater than the second radial distance at which the second region is arranged.

4. The valve stem of claim 1, where the first flange consists of a resilient elastic material.

5. A tire pressure monitoring sensor system assembly comprising:
   a rim for supporting a tire, the rim including an inner surface and an opposite outer surface, the rim defining a valve stem opening extending from the inner surface to the outer surface;
   a tire pressure monitoring system sensor arranged proximate the inner surface of the rim;
   a valve stem body including an attachment end connected to the tire pressure monitoring system sensor and an opposite air transfer end; and
   a grommet arranged between the attachment end and the air transfer end of the valve stem body, the grommet including a first flange engaging the inner surface of the rim and a second flange engaging the outer surface of the rim, the first flange including an outer peripheral edge tapering radially outward from a first region displaced a first radial distance from a longitudinal axis of the valve stem body to a second region displaced a second radial distance from the longitudinal axis of the valve stem body, wherein the second radial distance is greater than the first radial distance and the first region is arranged between the second region and the attachment end of the valve stem body.

6. The valve stem of claim 5, wherein the first radial distance is less than a minimum radial dimension of the valve stem opening.

7. The valve stem of claim 5, wherein the second radial distance is greater than a maximum radial dimension of the valve stem opening.

8. The valve stem of claim 5, wherein the first flange includes a substantially conical shape.

9. The valve stem of claim 5, wherein the second flange extends a maximum radial distance from the longitudinal axis of the valve stem body that is greater than the second radial distance at which the second region is arranged.

10. The valve stem of claim 5, wherein the first flange consists of a resilient elastic material.

11. The valve stem of claim 5, wherein the first flange is elastically compressible to enable the first flange to selectively pass through the valve stem opening from the outer surface of the rim to the inner surface of the rim.

12. A method of installing a valve stem into a valve stem opening of a rim for supporting a tire, the rim having an outer surface and an inner surface, the method comprising:
   inserting an attachment end of a valve stem body through the valve stem opening of the outer surface of the rim, wherein the valve stem body has a grommet positioned between the attachment end and an opposite air transfer end of the valve stem body, the grommet including a first flange and second flange each extending radially outward from the valve stem body, the first flange disposed between the second flange and the attachment end of the valve stem body, the first flange including an outer peripheral edge tapering radially outward from a first region arranged a first radial distance from a longitudinal axis of the valve stem body to a second region arranged a second radial distance from the longitudinal axis of the valve stem body, wherein the second radial distance is greater than the first radial distance and the first region is arranged axially between the second region and the attachment end of the valve stem body;
   passing the attachment end through the valve stem opening past the inner surface of the rim;
   passing the first flange of the grommet through the valve stem opening past the inner surface of the rim until the rim is seated between the first flange and the second flange with the first flange engaging the inner surface of the rim and the second flange engaging the outer surface of the rim; and
   attaching a tire pressure monitoring system sensor to the attachment end of the valve stem body.

13. The method of claim 12, wherein the first flange is elastically compressible to enable the first flange to pass through the valve stem opening from the outer surface of the rim to the inner surface of the rim.

14. The method of claim 12, wherein the first radial distance is less than a minimum radial dimension of the valve stem opening.

15. The method of claim 12, wherein the second radial distance is greater than a maximum radial dimension of the valve stem opening.

16. The method of claim 12, wherein the first flange is tapered inward from the air transfer end of the valve stem body toward the attachment end of the valve stem body.

17. The method of claim 12, wherein the second flange extends a maximum radial distance from the longitudinal axis of the valve stem body that is greater than the second radial distance at which the second region is arranged.

* * * * *